(12) United States Patent
Gorantla et al.

(10) Patent No.: US 12,118,385 B2
(45) Date of Patent: Oct. 15, 2024

(54) SYSTEM AND METHOD FOR REAL-TIME DATA DEPENDENCY MANAGEMENT AND TASK ORCHESTRATION

(71) Applicant: JPMorgan Chase Bank, N.A., New York, NY (US)

(72) Inventors: Chandra Gorantla, Sugar Land, TX (US); Kevin Fung, Warren, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 450 days.

(21) Appl. No.: 17/649,608

(22) Filed: Feb. 1, 2022

(65) Prior Publication Data
US 2023/0244523 A1    Aug. 3, 2023

(51) Int. Cl.
*G06F 9/48* (2006.01)
(52) U.S. Cl.
CPC ................................. *G06F 9/4881* (2013.01)
(58) Field of Classification Search
None
See application file for complete search history.

(56) References Cited

U.S. PATENT DOCUMENTS

| | | | |
|---|---|---|---|
| 9,710,332 B1* | 7/2017 | Fan | G06F 11/1402 |
| 9,864,642 B2* | 1/2018 | Gupta | G06F 9/4881 |
| 9,870,261 B2* | 1/2018 | Cao | G06F 8/61 |
| 10,275,278 B2* | 4/2019 | Bishop | G06F 9/45504 |
| 10,430,446 B2* | 10/2019 | Liu | G06F 16/316 |
| 10,977,319 B2* | 4/2021 | Bright | G06F 16/951 |
| 11,290,493 B2* | 3/2022 | Woolward | H04L 67/10 |
| 11,500,673 B2* | 11/2022 | Taher | G06F 9/485 |

* cited by examiner

*Primary Examiner* — Van H Nguyen
(74) *Attorney, Agent, or Firm* — GREENBLUM & BERNSTEIN, P.L.C.

(57) ABSTRACT

Various methods, apparatuses/systems, and media for real-time data dependency management are disclosed. A processor extracts data entity events from a plurality of data sets from upstream application; identifies dependent data entities for each data entity event based on initializing a data dependency graph with parent data nodes that represent all entities and their respective child data dependencies; publishes a data dependency event for each required parent data node in the data dependency graph; publishes a data dependency ready event for a certain parent node based on determining the certain parent node is configured for event publishing and that the certain parent node's child data dependencies are available; transmits the data dependency ready event to a task orchestration service platform; and orchestrates, upon receiving the data dependency ready event by the task orchestration service platform, a process instance and executes tasks for a corresponding data entity based on the process instance.

20 Claims, 6 Drawing Sheets

SYSTEM AND METHOD FOR REAL-TIME DATA DEPENDENCY MANAGEMENT AND TASK ORCHESTRATION

TECHNICAL FIELD

This disclosure generally relates to data processing, and, more particularly, to methods and apparatuses for implementing a real-time data dependency management module configured to identify real-time data dependencies and their availability to execute subsequent tasks orchestration in a work flow system.

BACKGROUND

The developments described in this section are known to the inventors. However, unless otherwise indicated, it should not be assumed that any of the developments described in this section qualify as prior art merely by virtue of their inclusion in this section, or that these developments are known to a person of ordinary skill in the art.

Today, a wide variety of business functions are commonly supported by software applications and tools, i.e., business intelligence (BI) tools. For instance, software has been directed to performance analysis, project tracking, margin management workflow, and competitive analysis, to name but a few. In general, large enterprises, corporations, agencies, institutions, and other organizations are facing a continuing problem of handling, processing, and/or accurately describing a vast amount of data (often exceeding 450 PB) that are crucial to plan actions at store level or market/regional level in an efficient and expedited manner. The stored data is often not in a centralized location, yet needs to be analyzed by a variety of persons within the organization to inform strategy, which may prove to be extremely time consuming, confusing, inaccurate, and inefficient for planning actions at both store level and market/regional level.

For example, margin calculations are critical to find an exposure timely and accurately. Calculations are dependent on many data sets received from upstream applications including but not limited to trades from trading platforms, reference data from internal strategic reference data source, initial margin from Gauss, and agreements setup with the clients. Often data sourcing is delayed and not detected before calculating the exposure causing incorrect reporting of the exposure with the clients and/or disputes from the clients.

Conventional tools associated with margin management workflow are configured for batch processing of portfolios. For example, these conventional tools, for a particular day, or for a particular region, take all the portfolios and perform batch processing across all the portfolios at a batch level and collect all the data from this batch processing. These conventional tools are not configured for identifying real-time data dependencies associated with each portfolio and lack configuration for processing portfolio at a granular level, i.e., one portfolio at a time, thereby causing incorrect reporting of the exposure.

Therefore, there is a need for an advanced tool that can address these conventional shortcomings.

SUMMARY

The present disclosure, through one or more of its various aspects, embodiments, and/or specific features or sub-components, provides, among other features, various systems, servers, devices, methods, media, programs, and platforms for implementing a real-time data dependency management module configured to identify real-time data dependencies and their availability to execute subsequent tasks orchestration in a work flow system at a granular level (i.e., processing one portfolio at a time), but the disclosure is not limited thereto.

According to an aspect of the present disclosure, a method for real-time data dependency management by utilizing one or more processors along with allocated memory is disclosed. The method may include: receiving a plurality of data sets from a plurality of upstream applications; extracting data entity events from the plurality of data sets; identifying dependent data entities for each data entity event based on initializing a data dependency graph with parent data nodes that represent all entities and their respective child data dependencies; publishing a data dependency event to an inbound topic of a data dependency service platform for each required parent data node in the data dependency graph; publishing a data dependency ready event for a certain parent node based on determining that the certain parent node is configured for event publishing and that the certain parent node's child data dependencies are available; transmitting the data dependency ready event to a task orchestration service platform; and orchestrating, upon receiving the data dependency ready event by the task orchestration service platform, a process instance and executing tasks for a corresponding data entity based on the process instance.

According to a further aspect of the present disclosure, the plurality of data sets may relate to margin management workflow and may include one or more of the following data: trades data, internal reference data, initial margin data, and agreements data between parties, but the disclosure is not limited thereto.

According to yet another aspect of the instant disclosure, the data dependency event may include data dependency state event that represents availability of a data dependency and a graph modification event that represents structural change in the data dependency graph, but the disclosure is not limited thereto.

According to a further aspect of the instant disclosure, the structural change in the data dependency graph may include one or more of the following events: adding a data dependency node; removing a data dependency node; and moving a child data dependency node to a different parent node, but the disclosure is not limited thereto.

According to an additional aspect of the instant disclosure, the method may further include: displaying the process instance as a task graph with nodes that are sequential or parallel with forks, joins and rules for task transitions.

According to yet another aspect of the instant disclosure, the method may further include: publishing events identifying what tasks to be executed, and wherein the task graph may include relationships among the tasks to identify what is dependent on what other task.

According to an aspect of the present disclosure, a system for real-time data dependency management is disclosed. The system may include: a processor; and a memory operatively connected to the processor via a communication interface, the memory storing computer readable instructions, when executed, may cause the processor to: receive a plurality of data sets from a plurality of upstream applications; extract data entity events from the plurality of data sets; identify dependent data entities for each data entity event based on initializing a data dependency graph with parent data nodes that represent all entities and their respective child data dependencies; publish a data dependency event to an inbound topic of a data dependency service platform for each required parent data node in the data dependency graph; publish a data dependency ready event for a certain parent node based on determining that the certain parent node is configured for event publishing and that the certain parent node's child data dependencies are available; transmit the data dependency ready event to a task orchestration service platform; and orchestrate, upon receiving the data dependency ready event by the task orchestration service platform, a process instance and execute tasks for a corresponding data entity based on the process instance.

According to a further aspect of the present disclosure, the processor may be further configured to: display the process instance as a task graph with nodes that are sequential or parallel with forks, joins and rules for task transitions.

According to yet another aspect of the instant disclosure, the processor may be further configured to publish events identifying what tasks to be executed, and wherein the task graph may include relationships among the tasks to identify what is dependent on what other task.

According to an aspect of the present disclosure, a non-transitory computer readable medium configured to store instructions for real-time data dependency management is disclosed. The instructions, when executed, may cause a processor to perform the following: receiving a plurality of data sets from a plurality of upstream applications; extracting data entity events from the plurality of data sets; identifying dependent data entities for each data entity event based on initializing a data dependency graph with parent data nodes that represent all entities and their respective child data dependencies; publishing a data dependency event to an inbound topic of a data dependency service platform for each required parent data node in the data dependency graph; publishing a data dependency ready event for a certain parent node based on determining that the certain parent node is configured for event publishing and that the certain parent node's child data dependencies are available; transmitting the data dependency ready event to a task orchestration service platform; and orchestrating, upon receiving the data dependency ready event by the task orchestration service platform, a process instance and executing tasks for a corresponding data entity based on the process instance.

According to a further aspect of the present disclosure, when executed, the instructions may further cause the processor to perform the following: displaying the process instance as a task graph with nodes that are sequential or parallel with forks, joins and rules for task transitions.

According to yet another aspect of the instant disclosure, when executed, the instructions may further cause the processor to perform the following: publishing events identifying what tasks to be executed, and wherein the task graph includes relationships among the tasks to identify what is dependent on what other task.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
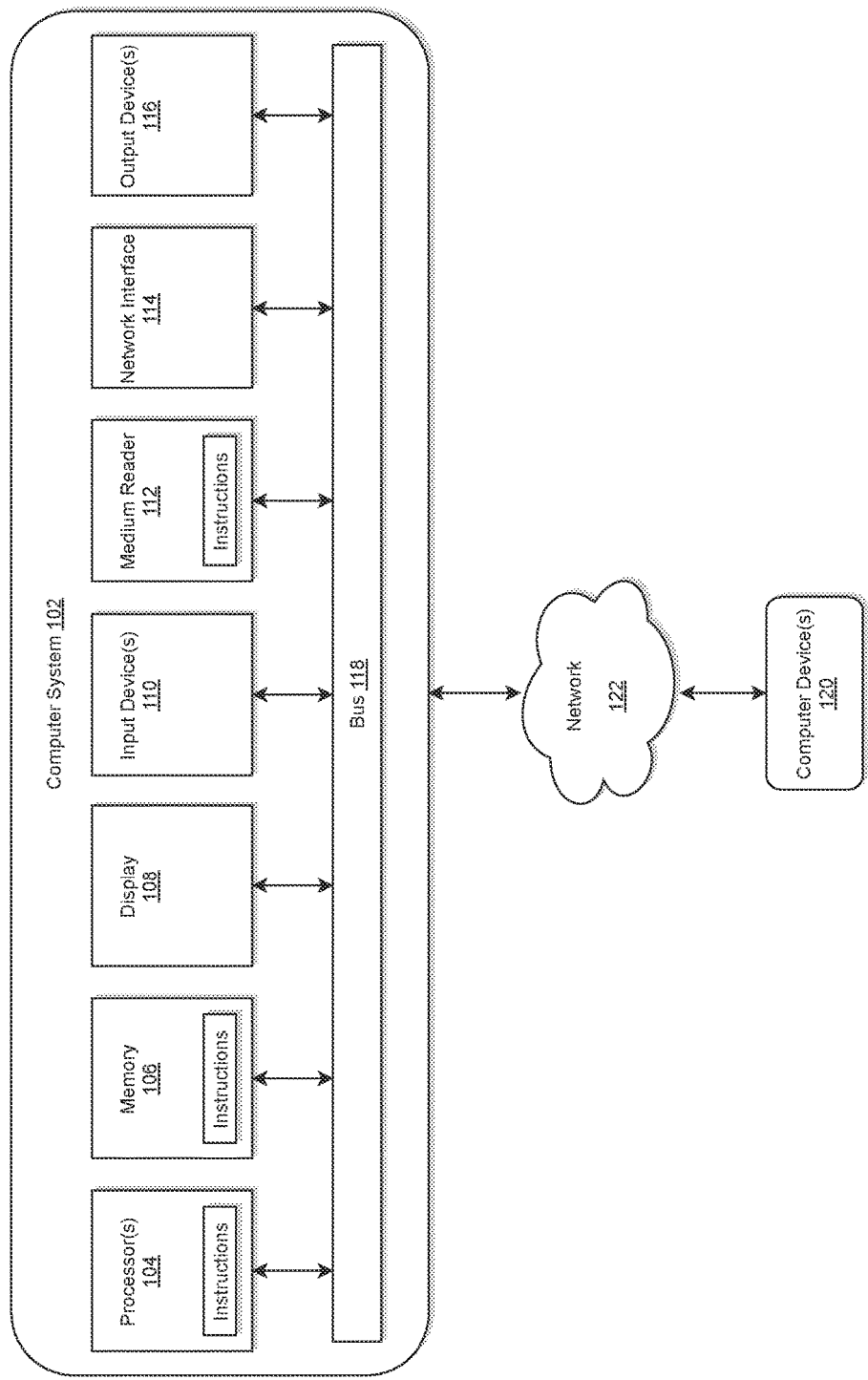
FIG. 1 illustrates a computer system for identifying real-time data dependencies and their availability to execute subsequent tasks orchestration in a work flow system at a granular level in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system for use in implementing a real-time data dependency management module configured for identifying real-time data dependencies and their availability to execute subsequent tasks orchestration in a work flow system at a granular level in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
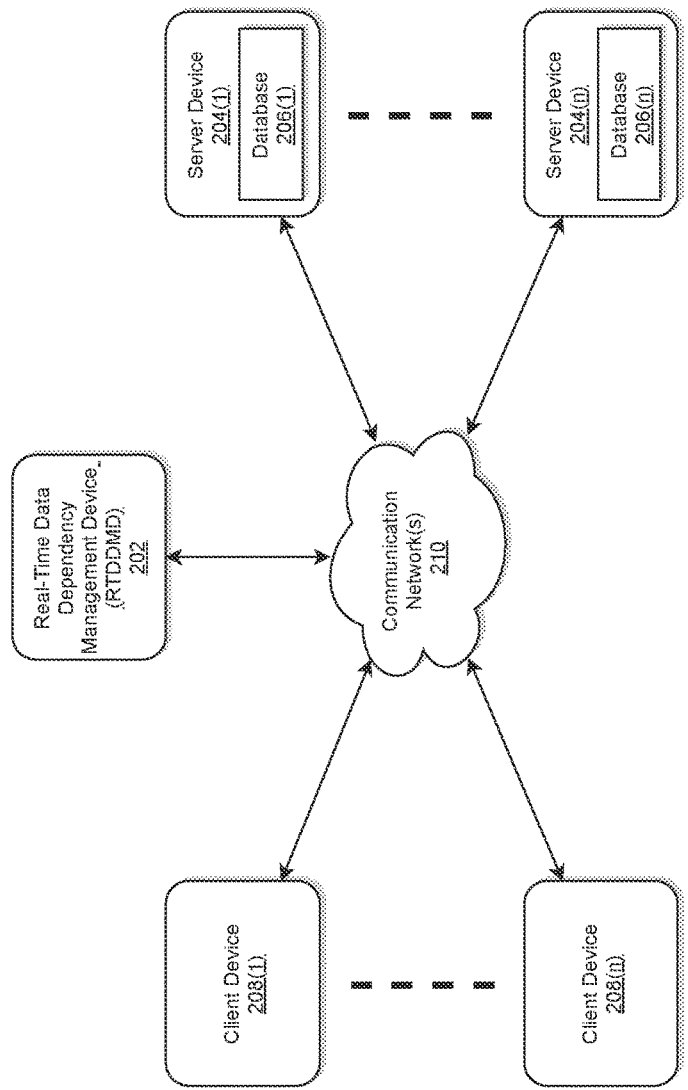
FIG. 2 illustrates an exemplary diagram of a network environment with a real-time data dependency management device in accordance with an exemplary embodiment.

Referring to FIG. 2, a schematic of an exemplary network environment 200 for implementing a real-time data dependency management device (RTDDMD) of the instant disclosure is illustrated.

According to exemplary embodiments, the above-described problems associated with conventional approach of data processing may be overcome by implementing an RTDDMD 202 as illustrated in FIG. 2 that may implement a real-time data dependency management module configured to identify real-time data dependencies and their availability to execute subsequent tasks orchestration in a work flow system at a granular level (i.e., processing one portfolio at a time), but the disclosure is not limited thereto, but the disclosure is not limited thereto.

The RTDDMD 202 may be the same or similar to the computer system 102 as described with respect to FIG. 1.

The RTDDMD 202 may store one or more applications that can include executable instructions that, when executed by the RTDDMD 202, cause the RTDDMD 202 to perform actions, such as to transmit, receive, or otherwise process network messages, for example, and to perform other actions described and illustrated below with reference to the figures. The application(s) may be implemented as modules or components of other applications. Further, the applica-tion(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the RTDDMD 202 itself, may be located in virtual server(s) running in a cloud-based computing environment rather than being tied to one or more specific physical network computing devices. Also, the application(s) may be running in one or more virtual machines (VMs) executing on the RTDDMD 202. Additionally, in one or more embodiments of this technology, virtual machine(s) running on the RTDDMD 202 may be managed or supervised by a hypervisor.

In the network environment 200 of FIG. 2, the RTDDMD 202 is coupled to a plurality of server devices 204(1)-204(n) that hosts a plurality of databases 206(1)-206(n), and also to a plurality of client devices 208(1)-208(n) via communication network(s) 210. A communication interface of the RTDDMD 202, such as the network interface 114 of the computer system 102 of FIG. 1, operatively couples and communicates between the RTDDMD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the RTDDMD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The RTDDMD 202 may be a standalone device or integrated with one or more other devices or apparatuses, such as one or more of the server devices 204(1)-204(n), for example. In one particular example, the RTDDMD 202 may be hosted by one of the server devices 204(1)-204(n), and other arrangements are also possible. Moreover, one or more of the devices of the RTDDMD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the RTDDMD 202 via the communication network(s) 210 according to the HTTP-based and/or JSON protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the RTDDMD 202 that may efficiently provide a platform for a real-time data dependency management module configured to identify real-time data dependencies and their availability to execute subsequent tasks orchestration in a work flow system at a granular level (i.e., processing one portfolio at a time), but the disclosure is not limited thereto.

The client devices 208(1)-208(n) may run interface applications, such as standard web browsers or standalone client applications, which may provide an interface to communicate with the RTDDMD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the RTDDMD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the RTDDMD 202, the server devices 204(1)-204(n), or the client devices 208(1)-208(n), for example, may be configured to operate as virtual instances on the same physical machine. For example, one or more of the RTDDMD 202, the server devices 204(1)-204(n), or the client devices 208(1)-208(n) may operate on the same physical device rather than as separate devices communicating through communication network(s) 210. Additionally, there may be more or fewer RTDDMDs 202, server devices 204(1)-204(n), or client devices 208(1)-208(n) than illustrated in FIG. 2. According to exemplary embodiments, the RTDDMD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
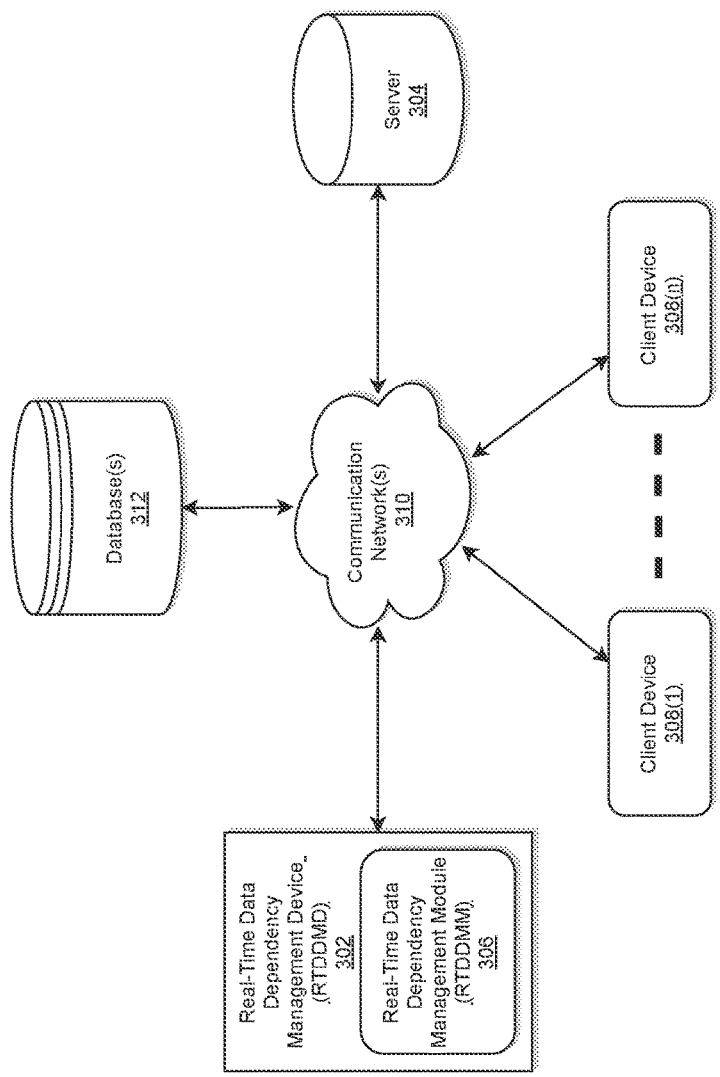
FIG. 3 illustrates a system diagram for implementing a real-time data dependency management device with a real-time data dependency management module in accordance with an exemplary embodiment.

FIG. 3 illustrates a system diagram for implementing a real-time data dependency management device (RTDDMD) having a real-time data dependency management module (RTDDMM) in accordance with an exemplary embodiment.

As illustrated in FIG. 3, the system 300 may include an RTDDMD 302 within which an RTDDMM 306 is embedded, a server 304, a plurality of data sources 312(1) . . . 312(n), a plurality of client devices 308(1) . . . 308(n), and a communication network 310.

According to exemplary embodiments, the RTDDMD 302 including the RTDDMM 306 may be connected to the server 304, and the database(s) 312 via the communication network 310. The RTDDMD 302 may also be connected to the plurality of client devices 308(1) . . . 308(n) via the communication network 310, but the disclosure is not limited thereto. According to exemplary embodiments, the database(s) 312 may be disparate data sources, i.e., each data source may be different in type than the other data sources, but the disclosure is not limited thereto.

According to exemplary embodiment, the RTDDMD 302 is described and shown in FIG. 3 as including the RTDDMM 306, although it may include other rules, policies, modules, databases, or applications, for example. According to exemplary embodiments, the database(s) 312 may be configured to store ready to use modules written for each API for all environments.

According to exemplary embodiments, the RTDDMM 306 may be configured to receive real-time feed of data from the plurality of client devices 308(1) . . . 308(n) via the communication network 310.

As will be described below, the RTDDMM 306 may be configured to receive a plurality of data sets from a plurality of upstream applications; extract data entity events from the plurality of data sets; identify dependent data entities for each data entity event based on initializing a data dependency graph with parent data nodes that represent all entities and their respective child data dependencies; publish a data dependency event to an inbound topic of a data dependency service platform for each required parent data node in the data dependency graph; publish a data dependency ready event for a certain parent node based on determining that the certain parent node is configured for event publishing and that the certain parent node's child data dependencies are available; transmit the data dependency ready event to a task orchestration service platform; and orchestrate, upon receiving the data dependency ready event by the task orchestration service platform, a process instance and executing tasks for a corresponding data entity based on the process instance, but the disclosure is not limited thereto.

The plurality of client devices 308(1) . . . 308(n) are illustrated as being in communication with the RTDDMD 302. In this regard, the plurality of client devices 308(1) . . . 308(n) may be "clients" of the RTDDMD 302 and are described herein as such. Nevertheless, it is to be known and understood that the plurality of client devices 308(1) . . . 308(n) need not necessarily be "clients" of the RTDDMD 302, or any entity described in association therewith herein. Any additional or alternative relationship may exist between either or both of the plurality of client devices 308(1) . . . 308(n) and the RTDDMD 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the RTDDMD 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The RTDDMD 302 may be the same or similar to the RTDDMD 202 as described with respect to FIG. 2, including any features or combination of features described with respect thereto.

Figure 4:
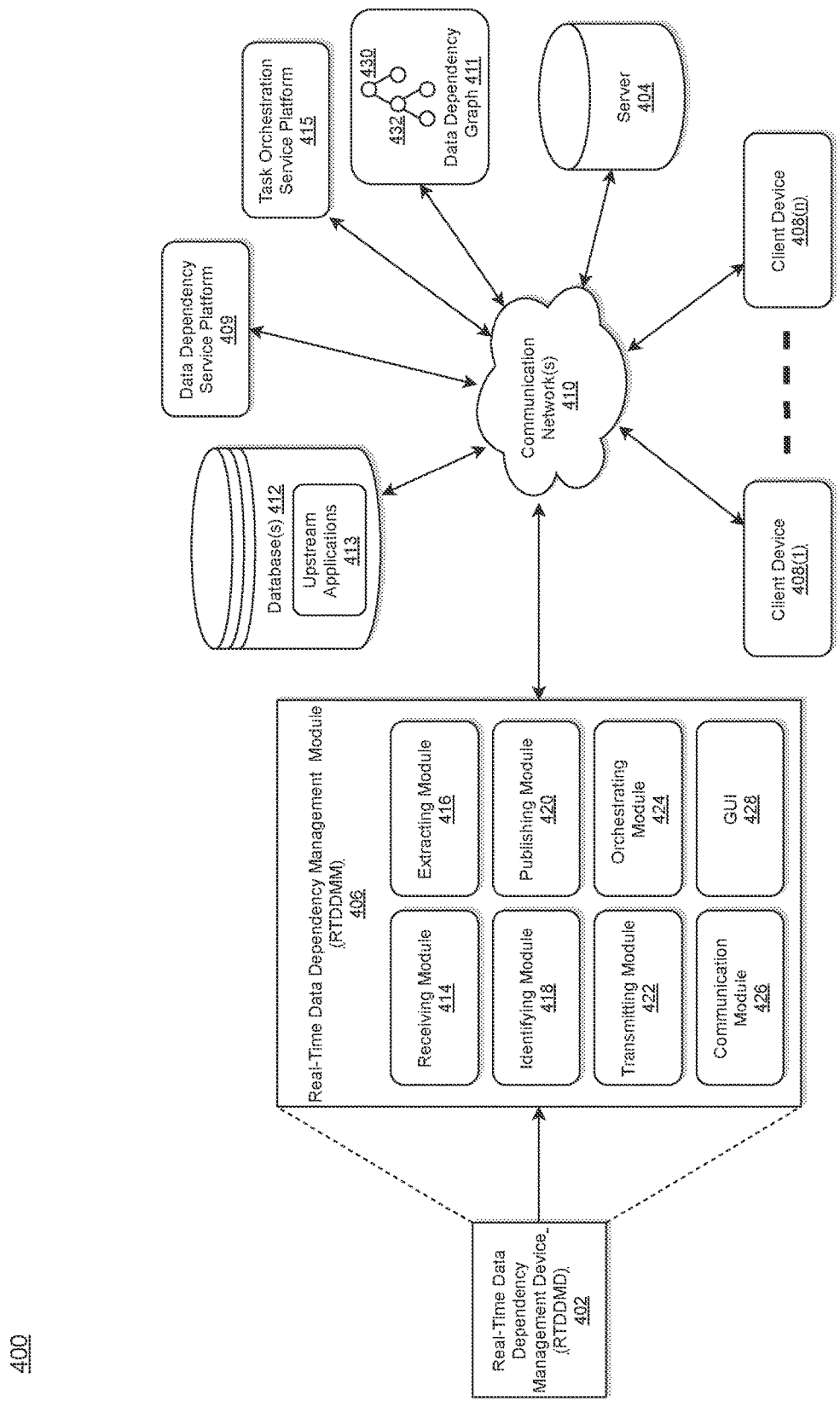
FIG. 4 illustrates a system diagram for implementing a real-time data dependency management module of FIG. 3 in accordance with an exemplary embodiment.

FIG. 4 illustrates a system diagram for implementing an RTDDMM of FIG. 3 in accordance with an exemplary embodiment.

According to exemplary embodiments, the system 400 may include an RTDDMD 402 within which an RTDDMM 406 is embedded, a server 404, database(s) 412 that may include a plurality of upstream applications 413 each including corresponding data set, a data dependency graph 411, a data dependency service platform 409, a task orchestration service platform 415, and a communication network 410.

According to exemplary embodiments, the RTDDMD 402 including the RTDDMM 406 may be connected to the server 404, the data dependency graph 411, the data dependency service platform 409, the task orchestration service platform 415, and the database(s) 412 via the communication network 410. The RTDDMD 402 may also be connected to the plurality of client devices 408(1)-408(n) via the communication network 410, but the disclosure is not limited thereto. The RTDDMM 406, the server 404, the plurality of client devices 408(1)-408(n), the database(s) 412, the communication network 410 as illustrated in FIG. 4 may be the same or similar to the RTDDMM 306, the server 304, the plurality of client devices 308(1)-308(n), the database(s) 312, the communication network 310, respectively, as illustrated in FIG. 3.

According to exemplary embodiments, as illustrated in FIG. 4, the RTDDMM 406 may include a receiving module 414, an extracting module 416, an identifying module 418, a publishing module 420, a transmitting module 422, an orchestrating module 424, a communication module 426, and a GUI 428.

According to exemplary embodiments, each of the receiving module 414, extracting module 416, identifying module 418, publishing module 420, transmitting module 422, orchestrating module 424, and the communication module 426 of the RTDDMM 406 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

According to exemplary embodiments, each of the receiving module 414, extracting module 416, identifying module 418, publishing module 420, transmitting module 422, orchestrating module 424, and the communication module 426 of the RTDDMM 406 may be implemented by microprocessors or similar, and may be programmed using software (e.g., microcode) to perform various functions discussed herein and may optionally be driven by firmware and/or software.

Alternatively, according to exemplary embodiments, each of the receiving module 414, extracting module 416, identifying module 418, publishing module 420, transmitting module 422, orchestrating module 424, and the communication module 426 of the RTDDMM 406 may be implemented by dedicated hardware, or as a combination of dedicated hardware to perform some functions and a processor (e.g., one or more programmed microprocessors and associated circuitry) to perform other functions.

According to exemplary embodiments, each of the receiving module 414, extracting module 416, identifying module 418, publishing module 420, transmitting module 422, orchestrating module 424, and the communication module 426 of the RTDDMM 406 may be called via corresponding API.

The process may be executed via the communication module 426 and the communication network 410, which may comprise plural networks as described above. For example, in an exemplary embodiment, the various components of the RTDDMM 406 may communicate with the server 404, and the database(s) 412 via the communication module 426 and the communication network 410. Of course, these embodiments are merely exemplary and are not limiting or exhaustive.

According to exemplary embodiments, the communication network 410 and the communication module 426 may be configured to establish a link among the database(s) 412, the client devices 408(1)-408(n), data dependency graph 411, data dependency service platform 409, task orchestration service platform 415, and the RTDDMM 406.

According to exemplary embodiments, the receiving module 414 may be configured to receive a plurality of data sets from a plurality of upstream applications 413. The extracting module 416 may be configured to extract data entity events from the plurality of data sets. The identifying module 418 may be configured to identify dependent data entities for each data entity event based on initializing a data dependency graph 411 with parent data nodes (e.g., 424) that represent all entities and their respective child data dependencies (e.g., 426). The publishing module 420 may be configured to publish a data dependency event to an inbound topic of a data dependency service platform 409 for each required parent data node in the data dependency graph 411. The publishing module 420 may be further configured to publish a data dependency ready event for a certain parent node based on determining that the certain parent node is configured for event publishing and that the certain parent node's child data dependencies are available.

According to exemplary embodiments, the transmitting module 422 may be configured to transmit the data dependency ready event to a task orchestration service platform 415. The orchestrating module 424 may be configured to orchestrate, upon receiving the data dependency ready event by the task orchestration service platform 415, a process instance and executing tasks for a corresponding data entity based on the process instance.

According to exemplary embodiments, the plurality of data sets may relate to margin management workflow and may include one or more of the following data: trades data, internal reference data, initial margin data, and agreements data between parties, but the disclosure is not limited thereto.

According to exemplary embodiments, the data dependency event may include data dependency state event that represents availability of a data dependency and a graph modification event that represents structural change in the data dependency graph, but the disclosure is not limited thereto.

According to exemplary embodiments, the structural change in the data dependency graph may include one or more of the following events: adding a data dependency node; removing a data dependency node; and moving a child data dependency node to a different parent node, but the disclosure is not limited thereto.

According to exemplary embodiments, the GUI 428 may be further configured to display the process instance as a task graph with nodes that are sequential or parallel with forks, joins and rules for task transitions.

According to exemplary embodiments, the publishing module 420 may be further configured to publish events identifying what tasks to be executed, and wherein the task graph may include relationships among the tasks to identify what is dependent on what other task.

Figure 5:
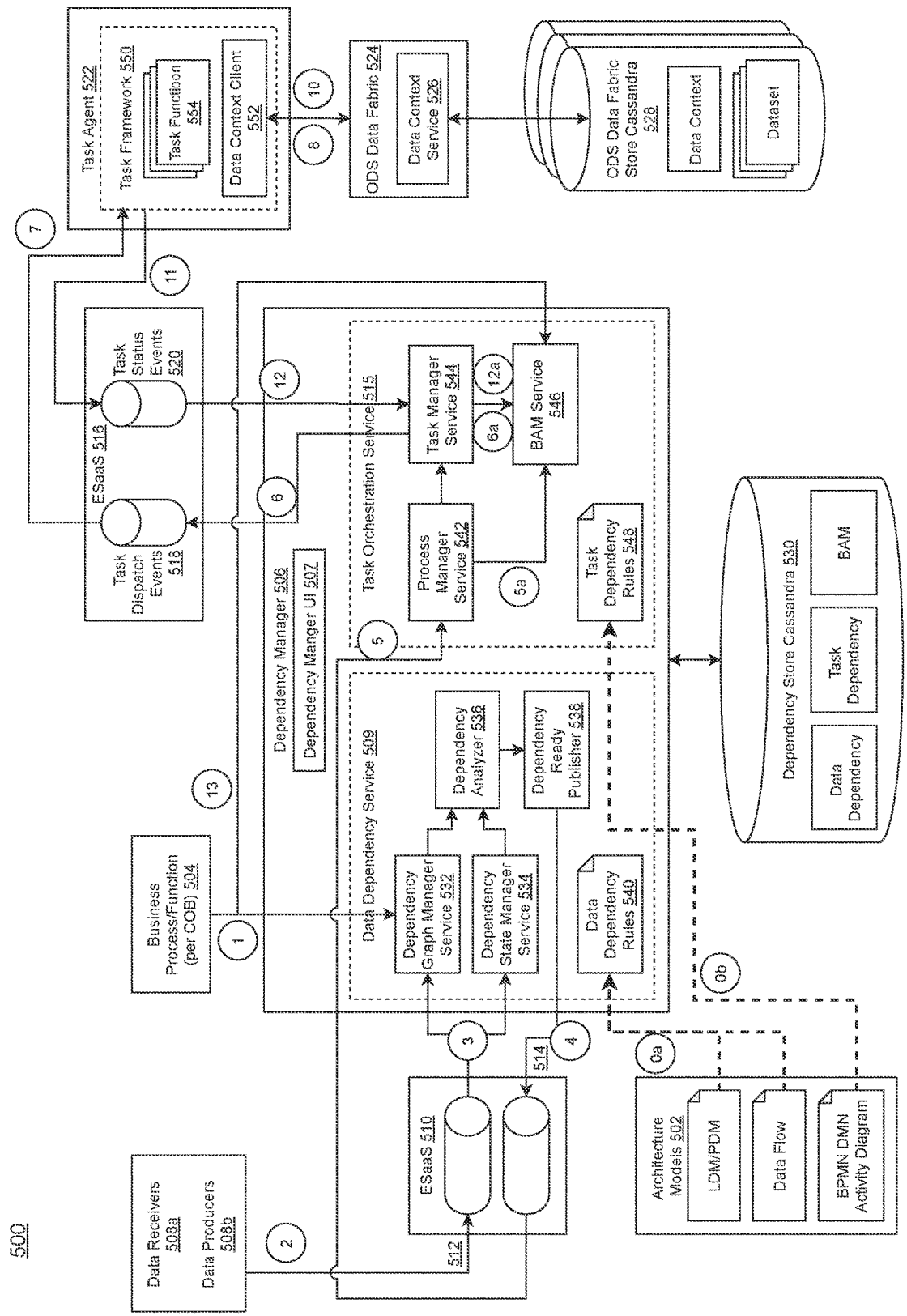
FIG. 5 illustrates an exemplary architecture implemented by the real-time data dependency management module of FIG. 4 in accordance with an exemplary embodiment.

FIG. 5 illustrates an exemplary architecture 500 implemented by the RTDDMM 406 of FIG. 4 in accordance with an exemplary embodiment. As illustrated in the FIG. 5, the architecture 500 may include a dependency manager 506 having a dependency manager UI 507, a data dependency service 509, and a task orchestration service 515. The dependency manager 506 may be the same or similar to the RTDDMM 406 as illustrated in FIG. 4, but the disclosure is not limited thereto.

Referring to FIGS. 4 and 5, according to exemplary embodiments, the dependency manager 506 may be operatively connected, via the communication module 426 and the communication network 410, to architecture models 502 that may include, but not limited thereto, LDM (logical data model) and/or PDM (physical data model), data flow models, BPMN (business process model and notation) and/or DMN (decision model notation) activity diagram, etc.; a business process/function (per close of business (COB)) 504; data receivers and producers 508; an e-commerce SaaS platform 510 for hosting data dependency events 512 and data dependency ready events 514; an e-commerce SaaS platform 516 for hosting task dispatch events 518 and task status events 520; a task agent 522; an ODS (operational data store) data fabric 524 for data content service 526 received based on data contents and data sets from ODS data fabric store 528; and a dependency store 530 for obtaining data related to, but not limited thereto, data dependency, task dependency and business activity monitoring (BAM).

According to exemplary embodiments, the data dependency service 509 may provide services related to, but not limited thereto, dependency graph manager service 532, dependency state manager service 534, dependency analyzer 536, dependency ready publisher 538, and data dependency rules 540.

According to exemplary embodiments, the task orchestration service 515 may provide services related to, but not limited thereto, process manager service 542, task manager service 544, BAM service 546, and task dependency rules 548.

According to exemplary embodiments, the task agent 522 having a task framework 550 for supporting processed related to data context client 552 and task functions 554.

Referring back to FIGS. 4 and 5, below are exemplary descriptions of the annotated steps 0a through 13 as illustrated in the exemplary architecture 500 of FIG. 5.

Data Dependency Service 509

The data dependency service 509 may consume data entity events and infer dependency readiness for dependent data entities, and publishes data entity readiness events.

At step 0a, data dependency rules 540 may be generated based on the architecture models 502.

At step 1, the business process/function 504 bootstraps its data dependency graph that is commensurate to its sub-universe of processing. For example, margin calculations for a COB date may initialize a dependency graph (e.g., data dependency graph 411 as illustrated in FIG. 4) with nodes that represent all the margin entities and their respective data dependencies for that COB date across all regions. When COB date rolls over to the next, a new instance of the data dependency graph 411 may be initialized.

At step 2, a data dependency event 512 may be published to the inbound topic of data dependency service 509 for each required data node in the data dependency graph by either a receiver (e.g., 508a of FIG. 5) that receives the data from upstream applications (e.g., 413 of FIG. 4) or a producer (e.g., 508b of FIG. 5) that produces the data. There may be two types of data dependency event: data dependency state event that represents availability of a data dependency; and graph modification event that represents structural change in the dependency graph, such as adding/removing a data dependency node, or moving a child data dependency node to a different parent node, but the disclosure is not limited thereto.

At step 3, data dependency event 512 may be received, persisted, and analyzed by the data dependency service 509.

At step 4, a data dependency ready event 514 for a parent node (e.g., 430 as illustrated in FIG. 4) may be published if it is configured for event publishing and when all its child dependencies (e.g., 432 as illustrated in FIG. 4) become available.

Task Orchestration Service 515

Upon receiving a data dependency ready event 514, the task orchestration service 515 may orchestrate a new process instance and execute the tasks for the relevant entity, effectively running an instance of the business process for that entity instance.

For example, at step 5, data dependency ready event 514 may be received and persisted by the process manager service 542 that in turn starts a process (workflow) instance. A process/workflow instance may be represented as a task graph with nodes that can be sequential or parallel with forks, joins and rules for task transitions.

At step 5a, statistics for process/workflow instances may be collected and stored in the BAM service 546 for offline analysis.

At step 6, the graph of task nodes may be then orchestrated by the task manager service 544 that publishes events for tasks that need to be performed.

At step 6a, statistics for tasks may be collected and stored in the BAM service 546 for offline analysis.

At steps 7, 8, 9, and 10, task events may be received and processed by task agents 522 that does the specific work while getting input datasets and producing output datasets from/to its ODS data fabric store 528 linked to the data context service 526 of the ODS data fabric 524.

At step 11, once the work is done, task agent 522 may publish task status event 520 to notify the task manager service 544 of the completion/error status.

At step 12, task manager service may receive and process the task status event 520 and determine the next task and repeat step 11 until all tasks are done for completing a process (workflow) instance.

At step 12a, statistics for task statuses may be collected and stored in BAM service 546 for offline analysis.

At step 13, the business process/function 504 may again bootstrap its data dependency graph that is commensurate to its sub-universe of processing as in step 1.

Figure 6:
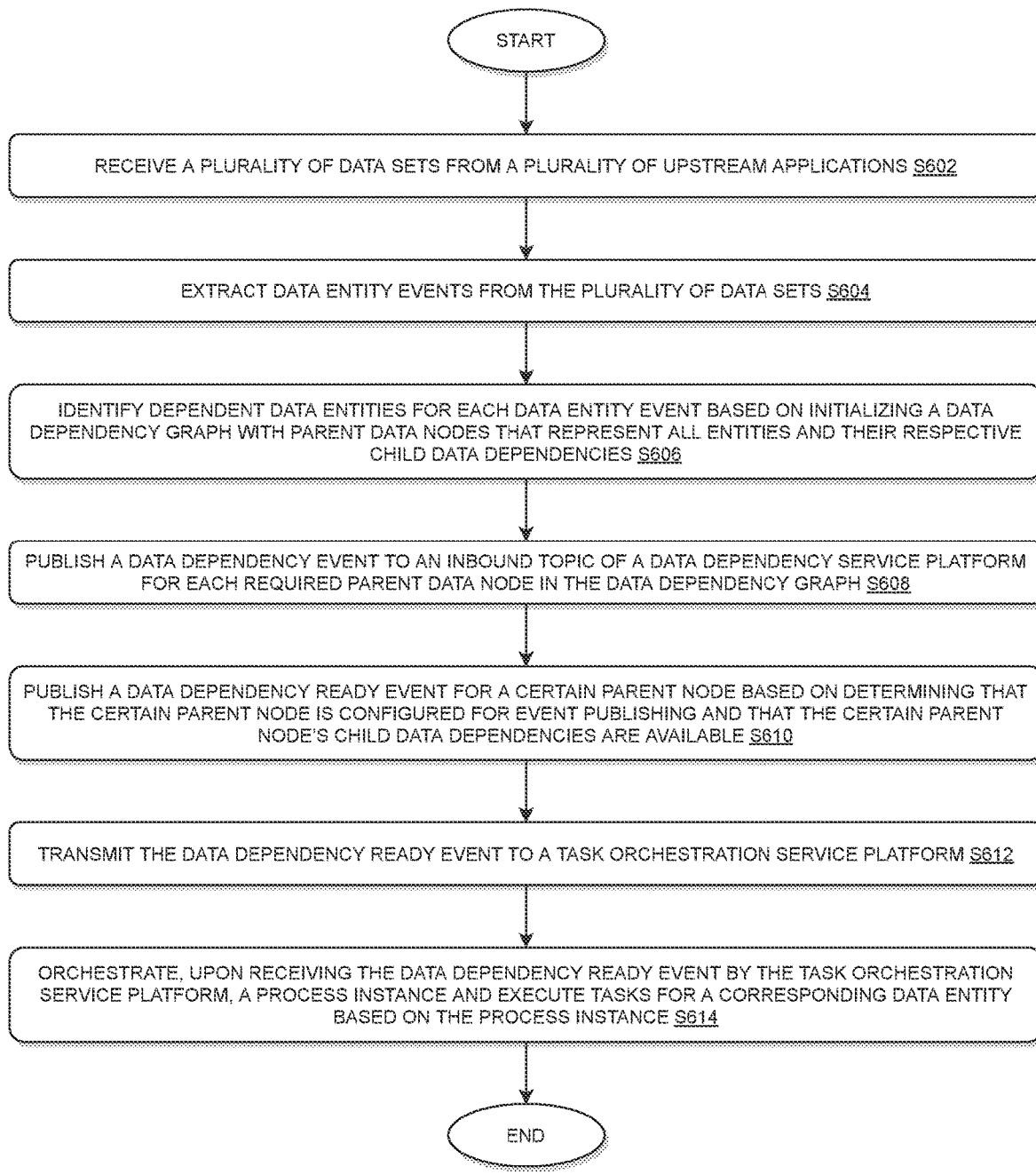
FIG. 6 illustrates a flow chart implemented by the real-time data dependency management module of FIG. 4 for identifying real-time data dependencies and their availability to execute subsequent tasks orchestration in a work flow system in accordance with an exemplary embodiment.

FIG. 6 illustrates a illustrates a flow chart 600 implemented by the RTDDMM 406 of FIG. 4 for identifying real-time data dependencies and their availability to execute subsequent tasks orchestration in a work flow system in accordance with an exemplary embodiment. It will be appreciated that the illustrated process 600 and associated steps may be performed in a different order, with illustrated steps omitted, with additional steps added, or with a combination of reordered, combined, omitted, or additional steps.

As illustrated in FIG. 6, at step S602, the process 600 may include receiving a plurality of data sets from a plurality of upstream applications.

At step S604, the process 600 may include extracting data entity events from the plurality of data sets.

At step S606, the process 600 may include identifying dependent data entities for each data entity event based on initializing a data dependency graph with parent data nodes that represent all entities and their respective child data dependencies.

At step S608, the process 600 may include publishing a data dependency event to an inbound topic of a data dependency service platform for each required parent data node in the data dependency graph.

At step S610, the process 600 may include publishing a data dependency ready event for a certain parent node based on determining that the certain parent node is configured for event publishing and that the certain parent node's child data dependencies are available.

At step S612, the process 600 may include transmitting the data dependency ready event to a task orchestration service platform.

At step S614, the process 600 may include orchestrating, upon receiving the data dependency ready event by the task orchestration service platform, a process instance and executing tasks for a corresponding data entity based on the process instance.

According to exemplary embodiments, the process 600 may further include: displaying the process instance as a task graph with nodes that are sequential or parallel with forks, joins and rules for task transitions.

According to exemplary embodiments, the process 600 may further include publishing events identifying what tasks to be executed, and wherein the task graph includes relationships among the tasks to identify what is dependent on what other task.

According to exemplary embodiments, the RTDDMD 402 may include a memory (e.g., a memory 106 as illustrated in FIG. 1) which may be a non-transitory computer readable medium that may be configured to store instructions for implementing an RTDDMM 406 for real-time data dependency management as disclosed herein. The RTDDMD 402 may also include a medium reader (e.g., a medium reader 112 as illustrated in FIG. 1) which may be configured to read any one or more sets of instructions, e.g., software, from any of the memories described herein. The instructions, when executed by a processor embedded within the RTDDMM 406 or within the RTDDMD 402, may be used to perform one or more of the methods and processes as described herein. In a particular embodiment, the instructions may reside completely, or at least partially, within the memory 106, the medium reader 112, and/or the processor 104 (see FIG. 1) during execution by the RTDDMD 402.

According to exemplary embodiments, the instructions, when executed, may cause a processor embedded within the RTDDMM 406 or the RTDDMD 402 to perform the following: receiving a plurality of data sets from a plurality of upstream applications; extracting data entity events from the plurality of data sets; identifying dependent data entities for each data entity event based on initializing a data dependency graph with parent data nodes that represent all entities and their respective child data dependencies; publishing a data dependency event to an inbound topic of a data dependency service platform for each required parent data node in the data dependency graph; publishing a data dependency ready event for a certain parent node based on determining that the certain parent node is configured for event publishing and that the certain parent node's child data dependencies are available; transmitting the data dependency ready event to a task orchestration service platform; and orchestrating, upon receiving the data dependency ready event by the task orchestration service platform, a process instance and executing tasks for a corresponding data entity based on the process instance. The processor may be the same or similar to the processor 104 as illustrated in FIG. 1 or the processor embedded within RTDDMD 202, RTDDMD 302, RTDDMD 402, and RTDDMM 406.

According to exemplary embodiments, the instructions, when executed, may cause the processor 104 to perform the following: displaying the process instance as a task graph with nodes that are sequential or parallel with forks, joins and rules for task transitions.

According to exemplary embodiments, the instructions, when executed, may cause the processor 104 to perform the following: publishing events identifying what tasks to be executed, and wherein the task graph includes relationships among the tasks to identify what is dependent on what other task.

According to exemplary embodiments as disclosed above in FIGS. 1-6, technical improvements effected by the instant disclosure may include a platform for implementing a real-time data dependency management module configured to identify real-time data dependencies and their availability to execute subsequent tasks orchestration in a work flow system at a granular level (i.e., processing one portfolio at a time), but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for real-time data dependency management by utilizing one or more processors along with allocated memory, the method comprising:
   receiving a plurality of data sets from a plurality of upstream applications;
   extracting data entity events from the plurality of data sets;
   identifying dependent data entities for each data entity event based on initializing a data dependency graph with parent data nodes that represent all entities and their respective child data dependencies;
   publishing a data dependency event to an inbound topic of a data dependency service platform for each required parent data node in the data dependency graph;
   publishing a data dependency ready event for a certain parent node based on determining that the certain parent node is configured for event publishing and that the certain parent node's child data dependencies are available;
   transmitting the data dependency ready event to a task orchestration service platform; and
   orchestrating, upon receiving the data dependency ready event by the task orchestration service platform, a process instance and executing tasks for a corresponding data entity based on the process instance.

2. The method according to claim 1, wherein the plurality of data sets relate to margin management workflow and include one or more of the following data: trades data, internal reference data, initial margin data, and agreements data between parties.

3. The method according to claim 1, wherein the data dependency event includes data dependency state event that represents availability of a data dependency.

4. The method according to claim 1, wherein the data dependency event includes graph modification event that represents structural change in the data dependency graph.

5. The method according to claim 1, wherein the structural change in the data dependency graph includes one or more of the following events: adding a data dependency node; removing a data dependency node; and moving a child data dependency node to a different parent node.

6. The method according to claim 1, further comprising:
   displaying the process instance as a task graph with nodes that are sequential or parallel with forks, joins and rules for task transitions.

7. The method according to claim 6, further comprising:
   publishing events identifying what tasks to be executed, and
   wherein the task graph includes relationships among the tasks to identify what is dependent on what other task.

8. A system for real-time data dependency management, the system comprising:
   a processor; and
   a memory operatively connected to the processor via a communication interface, the memory storing computer readable instructions, when executed, causes the processor to:
   receive a plurality of data sets from a plurality of upstream applications;
   extract data entity events from the plurality of data sets;
   identify dependent data entities for each data entity event based on initializing a data dependency graph with parent data nodes that represent all entities and their respective child data dependencies;
   publish a data dependency event to an inbound topic of a data dependency service platform for each required parent data node in the data dependency graph;
   publish a data dependency ready event for a certain parent node based on determining that the certain parent node is configured for event publishing and that the certain parent node's child data dependencies are available;
   transmit the data dependency ready event to a task orchestration service platform; and
   orchestrate, upon receiving the data dependency ready event by the task orchestration service platform, a process instance and execute tasks for a corresponding data entity based on the process instance.

9. The system according to claim 8, wherein the plurality of data sets relate to margin management workflow and include one or more of the following data: trades data, internal reference data, initial margin data, and agreements data between parties.

10. The system according to claim 8, wherein the data dependency event includes data dependency state event that represents availability of a data dependency.

11. The system according to claim 8, wherein the data dependency event includes graph modification event that represents structural change in the data dependency graph.

12. The system according to claim 8, wherein the structural change in the data dependency graph includes one or more of the following events: adding a data dependency node; removing a data dependency node; and moving a child data dependency node to a different parent node.

13. The system according to claim 8, wherein the processor is further configured to:
   display the process instance as a task graph with nodes that are sequential or parallel with forks, joins and rules for task transitions.

14. The system according to claim 13, wherein the processor is further configured to:
   publish events identifying what tasks to be executed, and
   wherein the task graph includes relationships among the tasks to identify what is dependent on what other task.

15. A non-transitory computer readable medium configured to store instructions for real-time data dependency management, wherein, when executed, the instructions cause a processor to perform the following:
   receiving a plurality of data sets from a plurality of upstream applications;
   extracting data entity events from the plurality of data sets;
   identifying dependent data entities for each data entity event based on initializing a data dependency graph with parent data nodes that represent all entities and their respective child data dependencies;
   publishing a data dependency event to an inbound topic of a data dependency service platform for each required parent data node in the data dependency graph;
   publishing a data dependency ready event for a certain parent node based on determining that the certain parent node is configured for event publishing and that the certain parent node's child data dependencies are available;

transmitting the data dependency ready event to a task orchestration service platform; and orchestrating, upon receiving the data dependency ready event by the task orchestration service platform, a process instance and executing tasks for a corresponding data entity based on the process instance.

16. The non-transitory computer readable medium according to claim 15, wherein the plurality of data sets relate to margin management workflow and include one or more of the following data: trades data, internal reference data, initial margin data, and agreements data between parties.

17. The non-transitory computer readable medium according to claim 15, wherein the data dependency event includes data dependency state event that represents availability of a data dependency and graph modification event that represents structural change in the data dependency graph.

18. The non-transitory computer readable medium according to claim 15, wherein the structural change in the data dependency graph includes one or more of the following events: adding a data dependency node; removing a data dependency node; and moving a child data dependency node to a different parent node.

19. The non-transitory computer readable medium according to claim 15, wherein, when executed, the instructions further cause the processor to perform the following:

displaying the process instance as a task graph with nodes that are sequential or parallel with forks, joins and rules for task transitions.

20. The non-transitory computer readable medium according to claim 19, wherein, when executed, the instructions further cause the processor to perform the following:

publishing events identifying what tasks to be executed, and wherein the task graph includes relationships among the tasks to identify what is dependent on what other task.

* * * * *